(12) United States Patent
Kuragano

(10) Patent No.: US 11,007,586 B2
(45) Date of Patent: May 18, 2021

(54) PORTABLE CUTTER

(71) Applicant: Koki Holdings Co., Ltd., Tokyo (JP)

(72) Inventor: Shinji Kuragano, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/471,572

(22) PCT Filed: Nov. 22, 2017

(86) PCT No.: PCT/JP2017/041998
§ 371 (c)(1),
(2) Date: Jun. 20, 2019

(87) PCT Pub. No.: WO2018/123366
PCT Pub. Date: Jul. 5, 2018

(65) Prior Publication Data
US 2019/0388984 A1 Dec. 26, 2019

(30) Foreign Application Priority Data
Dec. 28, 2016 (JP) .............................. JP2016-256419

(51) Int. Cl.
*B23D 45/16* (2006.01)
*B27B 9/02* (2006.01)
(52) U.S. Cl.
CPC ................ *B23D 45/16* (2013.01); *B27B 9/02* (2013.01)
(58) Field of Classification Search
CPC ................................... B23D 45/16; B27B 9/02
(Continued)

(56) References Cited

U.S. PATENT DOCUMENTS 4,589,208 A * 5/1986 Iwasaki ..................... B27B 9/02
30/376
5,010,651 A * 4/1991 Techter ..................... B27B 9/02
144/136.1
(Continued)

FOREIGN PATENT DOCUMENTS

JP H0646903 6/1994
JP H0683222 11/1994
(Continued)

OTHER PUBLICATIONS

"International Search Report (Form PCT/ISA/210) of PCT/JP2017/041998," dated Jan. 23, 2018, with English translation thereof, pp. 1-4.

*Primary Examiner* — Hwei-Siu C Payer
(74) *Attorney, Agent, or Firm* — JCIPRNET

(57) ABSTRACT

Provided is a portable cutter wherein the entire base has increased strength. This portable cutter is provided with: a body having a prime mover and a saw blade which is driven by the prime mover; a base having a through-hole through which the saw blade protrudes and sliding on a material to be cut; and a stand which rises from the base and to which the body is connected. If the direction in which cutting progresses is designated as a front-rear direction, a rib extending in the front-rear direction is provided to the base. The stand is configured such that, in the left-right direction, the stand is either located outside a region in which the through-hole is formed, or extended to the outside of the region. The positions, in the front-rear direction, of the stand and the rib partially overlap each other.

9 Claims, 12 Drawing Sheets

1 Portable cutter

(58) Field of Classification Search
USPC .......................................................... 30/376
See application file for complete search history.

(56) References Cited

U.S. PATENT DOCUMENTS

| | | | | |
|---|---|---|---|---|
| 5,758,425 | A * | 6/1998 | Gallagher | ................. B27B 9/02 30/376 |
| 6,202,311 | B1 * | 3/2001 | Nickels, Jr. | ............... B27B 9/02 30/376 |
| 7,975,388 | B2 * | 7/2011 | Fuchs | ....................... B27B 9/00 30/377 |
| 8,209,872 | B1 | 7/2012 | Ende | |
| 9,242,390 | B2 * | 1/2016 | Nicholson | .............. B27G 19/04 |
| 2006/0016082 | A1 * | 1/2006 | Niwa | ....................... B27B 9/02 30/388 |
| 2006/0162171 | A1 * | 7/2006 | Fuchs | ................... B23D 51/02 30/374 |
| 2019/0388984 | A1 * | 12/2019 | Kuragano | ............. B23D 45/16 |
| 2020/0094433 | A1 * | 3/2020 | Knight | ..................... B27B 5/29 |

FOREIGN PATENT DOCUMENTS

| | | |
|---|---|---|
| JP | 2006335034 | 12/2006 |
| JP | 2012115969 | 6/2012 |

* cited by examiner

1 Portable cutter

PORTABLE CUTTER

CROSS-REFERENCE TO RELATED APPLICATION

This application is a 371 of international application of PCT application serial no. PCT/JP2017/041998, filed on. Nov. 22, 2017, which claims the priority benefits of Japan application no. 2016-256419, filed on Dec. 28, 2016. The entirety of each of the above-mentioned patent applications is hereby incorporated by reference herein and made a part of this specification.

BACKGROUND

Technical Field

The disclosure relates to a portable cutter such as a circular saw.

Description of Related Art

A circular saw generally has a structure that a body having a built-in prime mover (a motor, for example) is connected to the upper portion of a base, and a circular saw blade rotationally driven by the prime mover protrudes from the bottom surface of the base by a predetermined amount and a material to be cut which is set on the bottom side of the base is machined by the circular saw blade (Patent Document 1 below). Conventionally, die casting is often used for the base of the circular saw. However, as die casting is hard but brittle, a base made of a sheet metal part is required in some cases.

RELATED ART

Patent Document

Patent Document 1 Japanese Utility Model Publication No. H06-083222

SUMMARY

Problems to be Solved

The sheet metal part can increase the strength of a plate member with a reinforcing rib formed by, for example, emboss processing. In addition, in the case of a circular saw, a metal stand disposed upright on the base for adjusting the tilting position of the body also contributes to the reinforcement of the base. Here, as in the comparative example shown in FIG. 23, if there is a cross section where neither the stand 840 nor the ribs 832 exists between the stand 840 and the ribs 832 (the F-F cross section in FIG. 23), when a load is applied to the base 830, the base may be easily bent and deformed at the cross section.

In view of the above situation, the disclosure provides a portable cutter that can improve the strength of the entire base.

Means for Solving the Problems

An embodiment of the disclosure is a portable cutter. The portable cutter includes: a body including a prime mover and a blade driven by the prime mover; a base having a through-hole, through which the blade protrudes, and sliding on a material to be cut; and a stand disposed upright on the base for connecting the body, wherein when a cutting progress direction is set as a front-rear direction, the base is provided with a rib extending in the front-rear direction, the stand is positioned or extends outside a formation region of the through-hole in a left-right direction, and positions, in the front-rear direction, of the stand and the rib partially overlap each other.

The base may be a sheet metal part, and the stand may be a part separate from the base.

The stand may be a tilting guide for adjusting an inclination angle of the body with the front-rear direction as an axis.

The stand may include a first part extending in the left-right direction, and a second part extending from the first part in the front-rear direction, and positions, in the front-rear direction, of the second part and the rib may partially overlap each other.

The stand may include a tunnel part, and the rib may extend into the tunnel part.

Another embodiment of the disclosure is a portable cutter. The portable cutter includes: a body including a prime mover and a blade driven by the prime mover; a base having a through-hole, through which the blade protrudes, and sliding on a material to be cut; and a stand disposed upright on the base for connecting the body, wherein when a sliding direction of the base is set as a front-rear direction, the base is provided with a rib extending in the front-rear direction, the stand is disposed upright on the base on a front side of the rib, and positions, in the front-rear direction, of the stand and the rib partially overlap each other.

Another embodiment of the disclosure is a portable cutter. The portable cutter includes: a body including a prime mover and a blade driven by the prime mover; a base having a through-hole, through which the blade protrudes, and sliding on a material to be cut; and a stand disposed upright on the base for connecting the body, wherein when a sliding direction of the base is set as a front-rear direction, the base is provided with a rib extending in the front-rear direction, the stand is disposed upright on the base on a front side of the rib, and positions of the stand and the rib partially overlap each other in a formation region of the through-hole in a left-right direction that intersects the sliding direction.

Any combination of the above components obtained by converting the representation of the disclosure between methods, systems or the like is also effective as an embodiment of the disclosure.

Effects

According to the disclosure, it is possible to provide a portable cutter that can improve the strength of the entire base.

DESCRIPTION OF THE EMBODIMENTS

Figure 1:
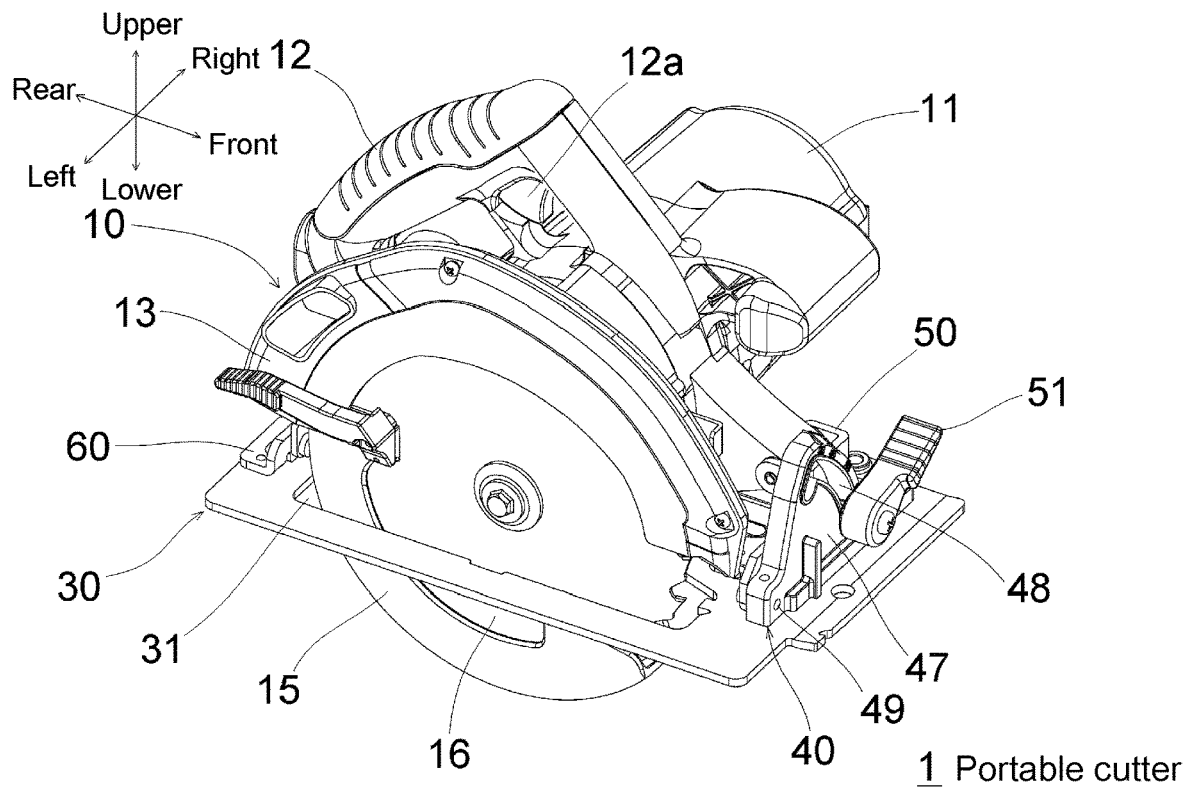
FIG. 1 is a perspective view of the portable cutter 1 according to the first embodiment of the disclosure as viewed from the front upper left side.
Figure 2:
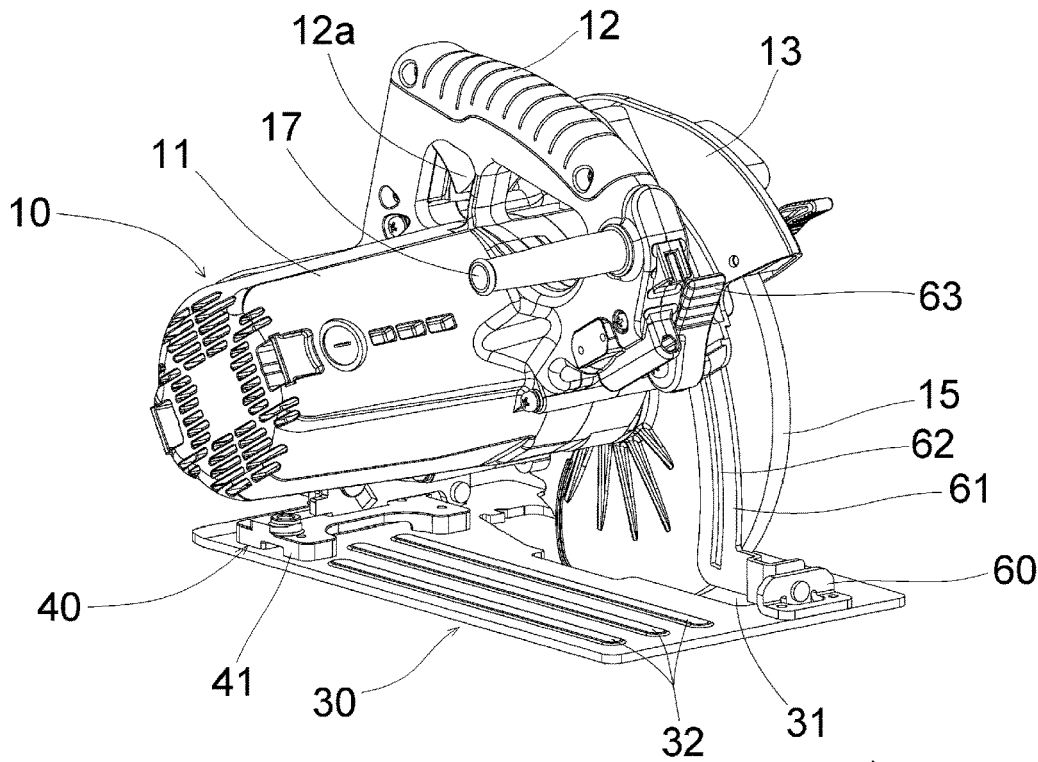
FIG. 2 is a perspective view of the portable cutter 1 as viewed from the rear upper right side.
Figure 3:
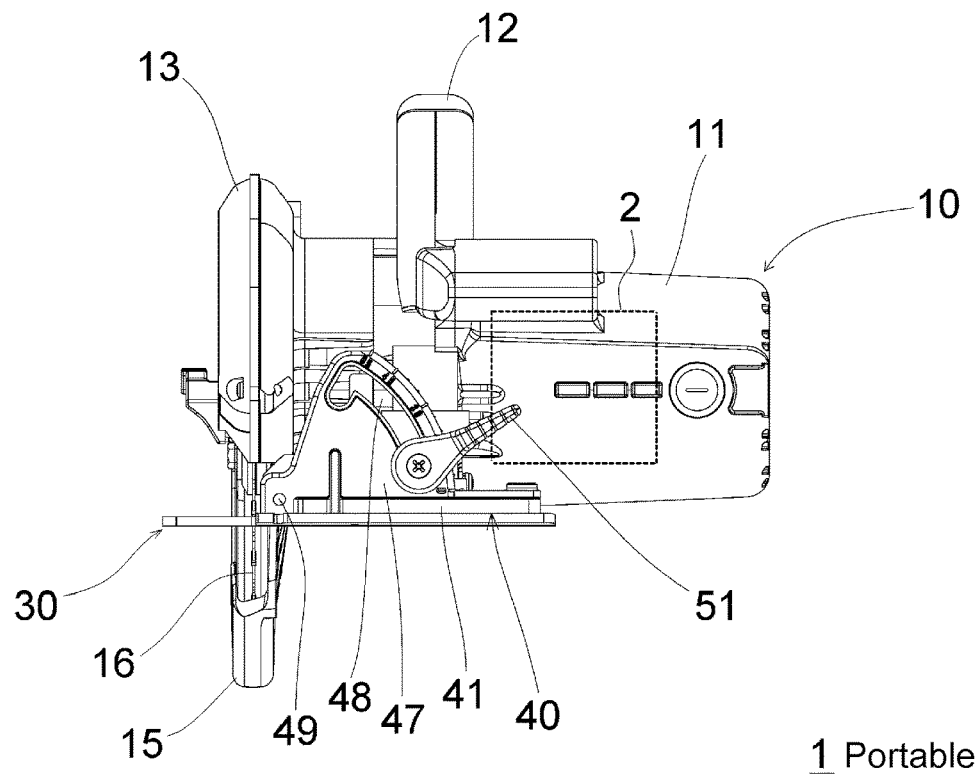
FIG. 3 is a front view of the portable cutter 1.
Figure 4:
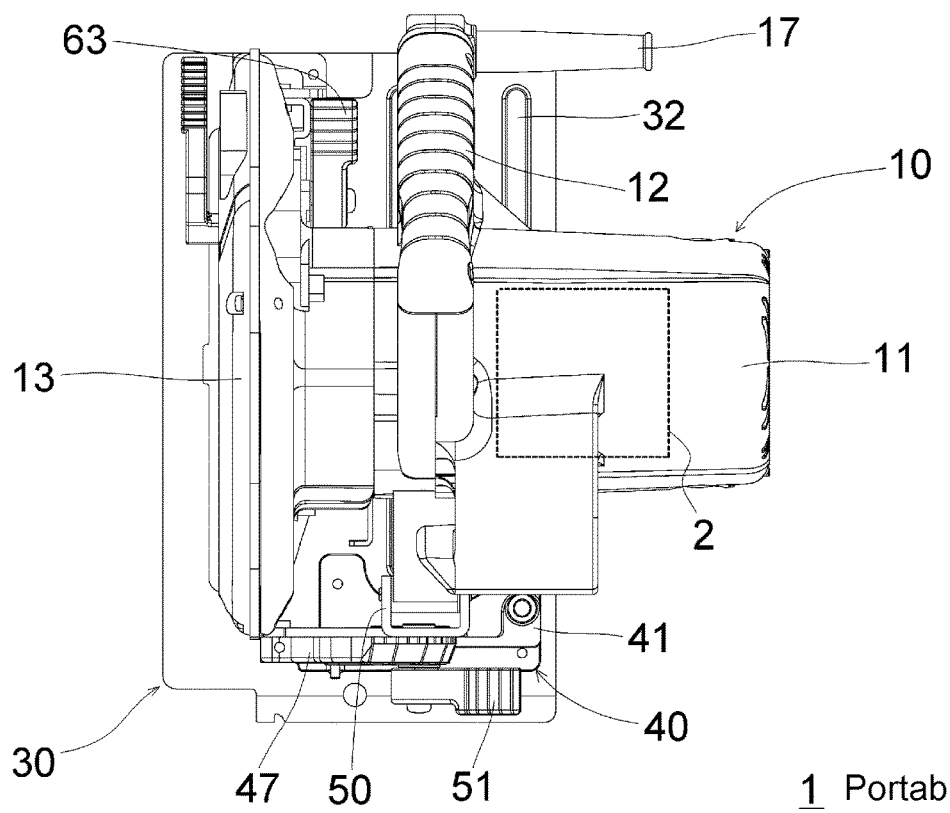
FIG. 4 is a plan view of the portable cutter 1.
Figure 5:
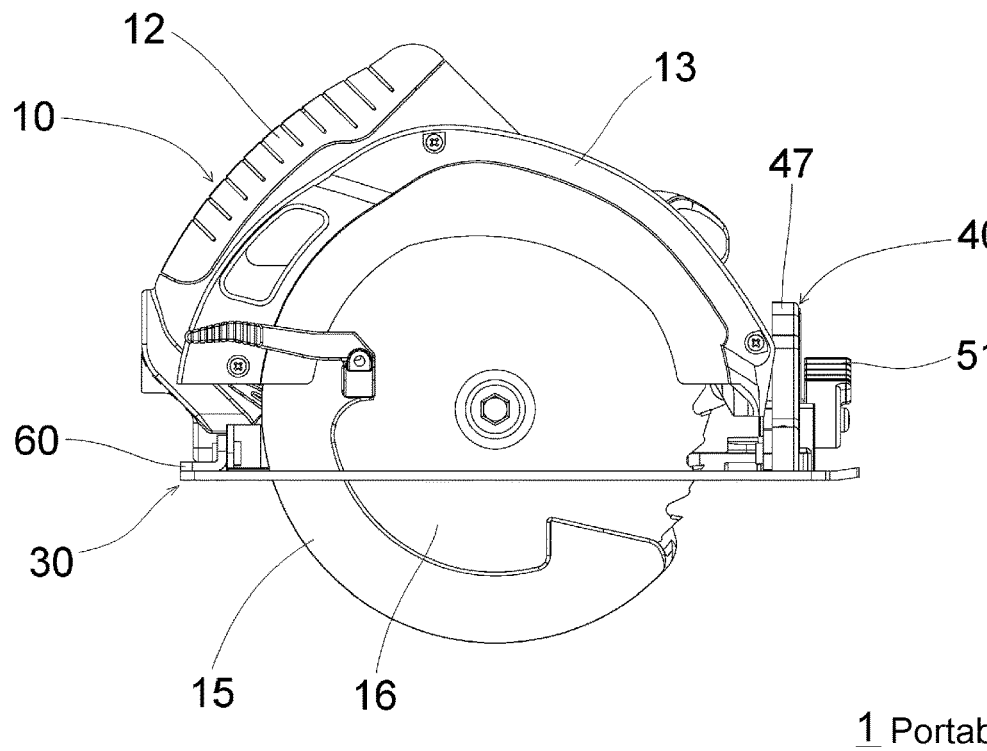
FIG. 5 is a left side view of the portable cutter 1.
Figure 6:
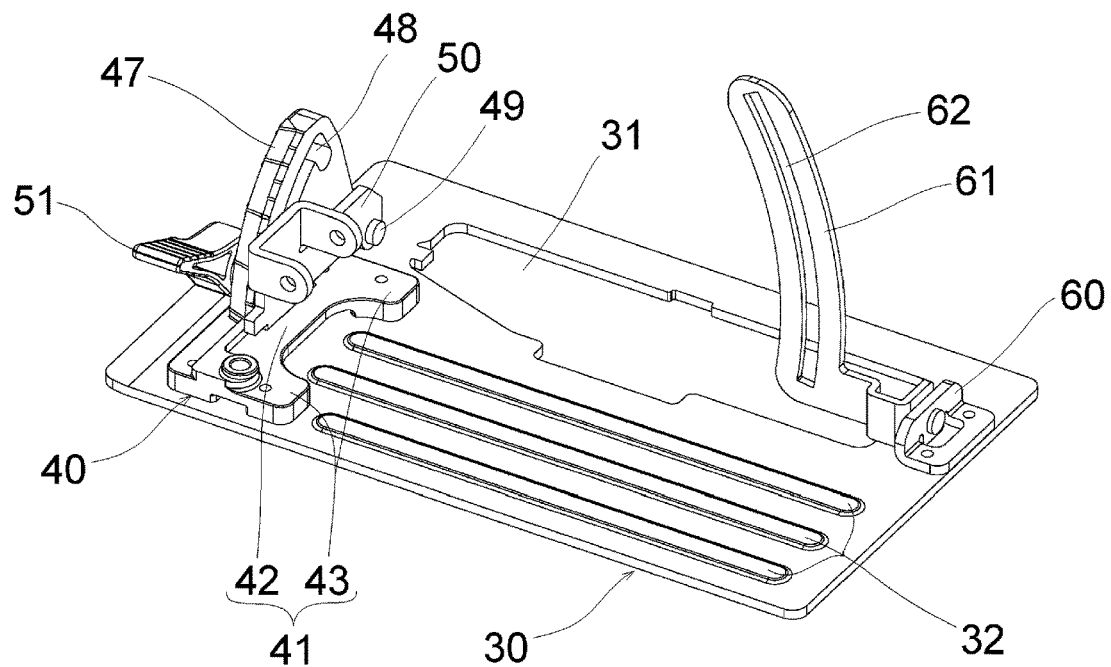
FIG. 6 is a perspective view of the base set (the part excluding the body 10 of the portable cutter 1) of the portable cutter 1 as viewed from the rear upper right side.
Figure 7:
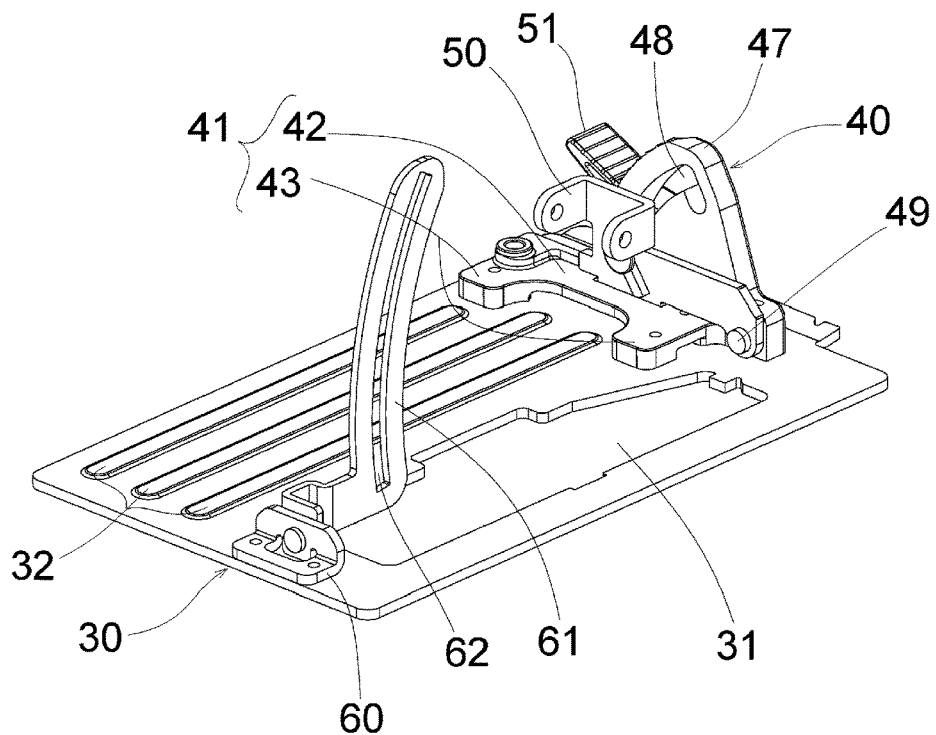
FIG. 7 is a perspective view of the base set of FIG. 6 as viewed from the rear upper left side.
Figure 8:
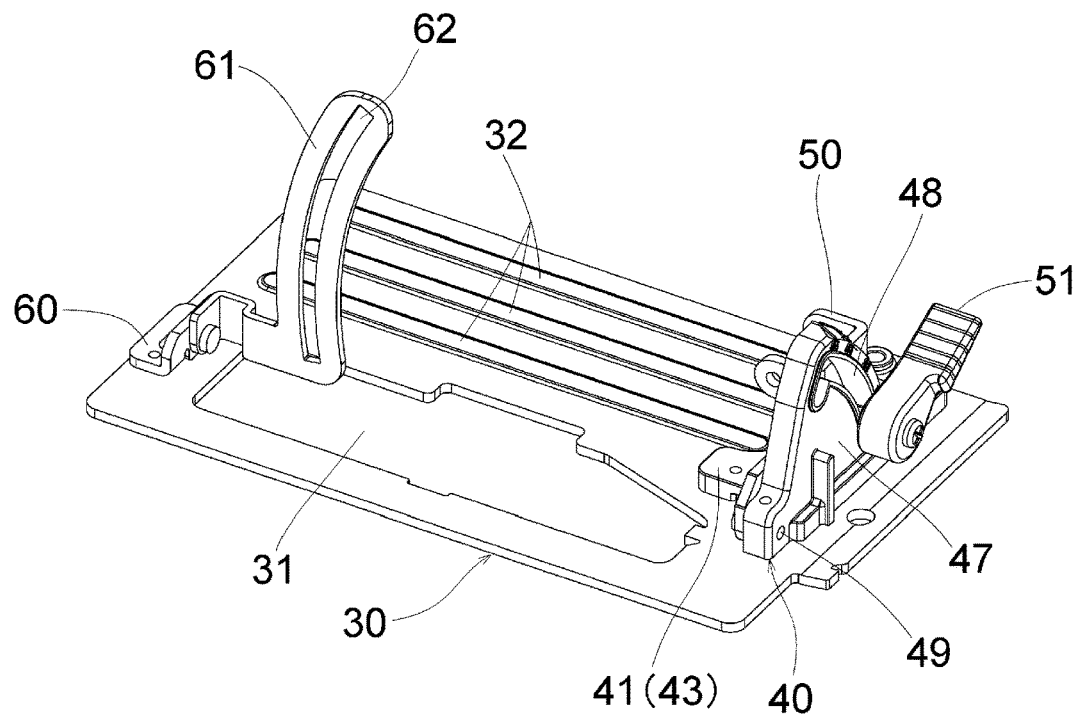
FIG. 8 is a perspective view of the base set of FIG. 6 as viewed from the front upper left side.
Figure 9:
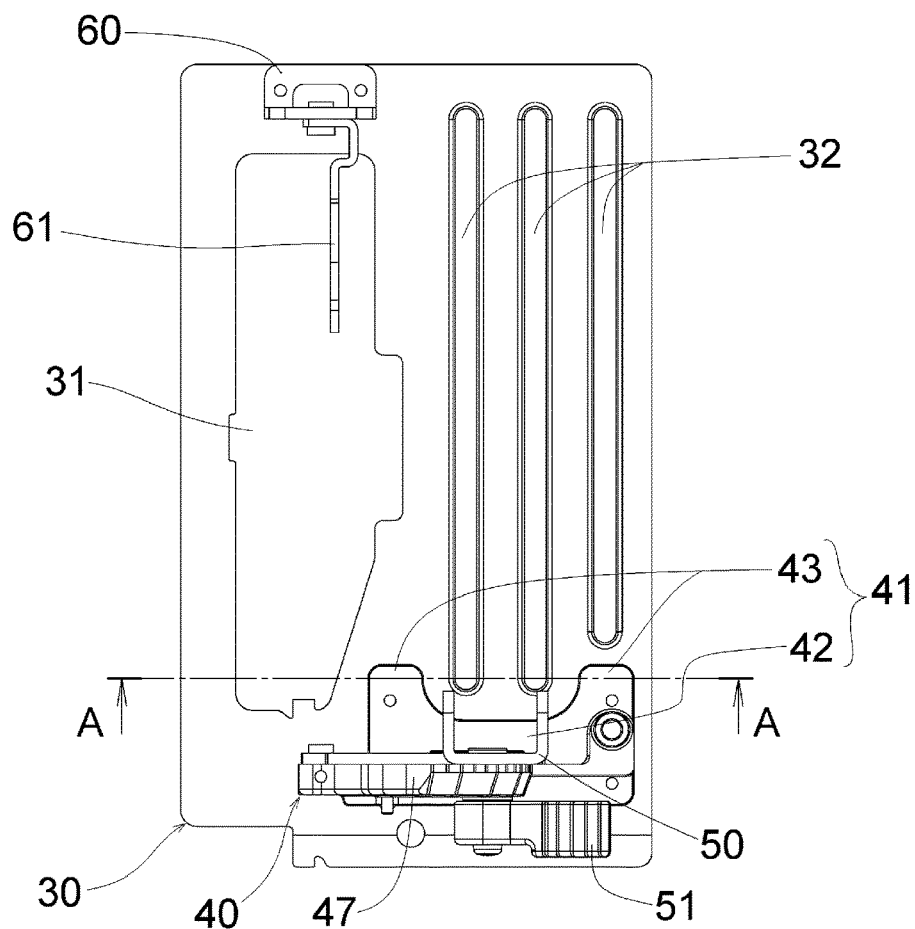
FIG. 9 is a plan view of the base set of FIG. 6.

Hereinafter, embodiments of the disclosure will be described in detail with reference to the drawings. The same or equivalent components, members or the like shown in the drawings are denoted by the same reference numerals, and redundant description will be omitted as appropriate. In addition, the embodiments are not intended to limit the disclosure and are merely examples, and all the features and combinations thereof described in the embodiments are not necessarily essential to the disclosure.

(First Embodiment) A portable cutter 1 according to the first embodiment of the disclosure will be described with reference to FIG. 1 to FIG. 10. The front-rear, upper-lower, and left-right directions are defined by FIG. 1. The portable cutter 1 is a circular saw and includes a body 10, a base 30, a stand 40, a connection member 50, a bracket 60, and a link 61. The body 10 has a known configuration and will be briefly described below.

The body 10 is supported to be tiltable in the left-right direction or one of the left and right directions and swingable in the upper-lower direction with respect to the base 30. The body 10 has an outer shell formed by a housing 11 and a gear cover 13. The housing 11 is a resin molded body, for example, and accommodates therein a motor 2 (electric motor) that serves as the prime mover, as represented by broken lines in FIG. 3 and FIG. 4. A handle part 12 is provided on the housing 11. The handle part 12 is provided with a trigger 12a for the user to switch between driving and stopping the motor 2. The gear cover 13 is made of metal such as aluminum, for example, and covers a deceleration mechanism (not shown) that decelerates the rotation of the motor 2 and transmits it to a saw blade 16, and covers the upper half of the saw blade 16. A protective cover 15 is a resin molded body, for example, and covers the lower half of the saw blade 16 to be openable and closable. The saw blade 16 that serves as a blade is a disk-shaped rotary blade and is rotationally driven by the motor 2. The saw blade 16 protrudes downward from the lower surface of the base 30 through a through-hole 31 of the base 30.

Figure 10:
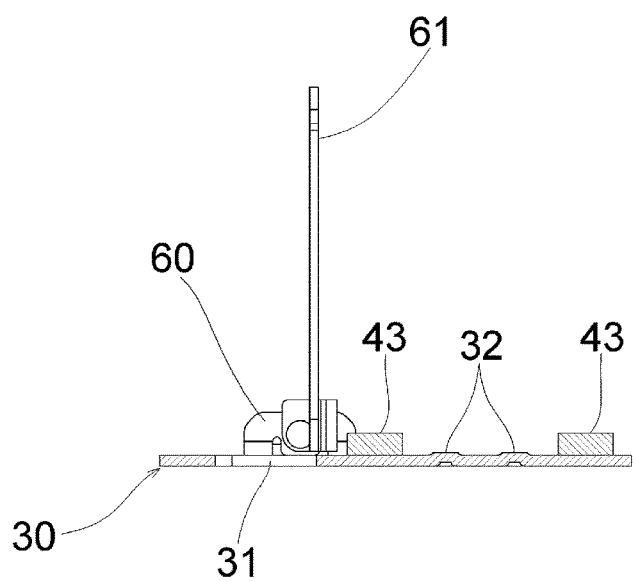
FIG. 10 is a cross-sectional view along the line A-A in FIG. 9.
Figure 11:
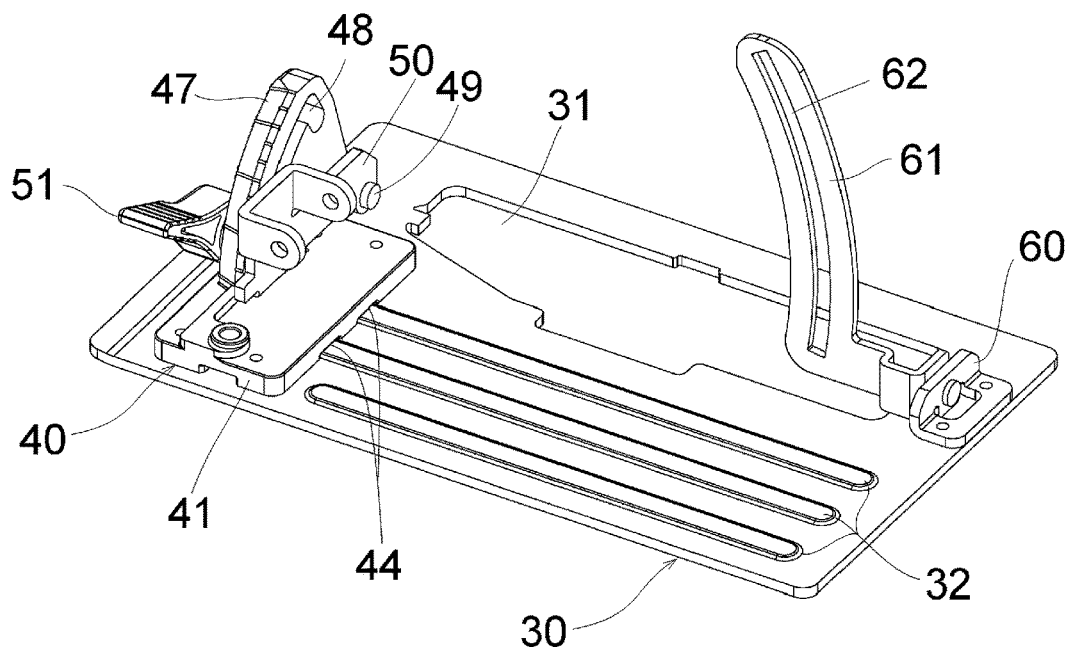
FIG. 11 is a perspective view of the base set of the portable cutter according to the second embodiment of the disclosure as viewed from the rear upper right side.
Figure 12:
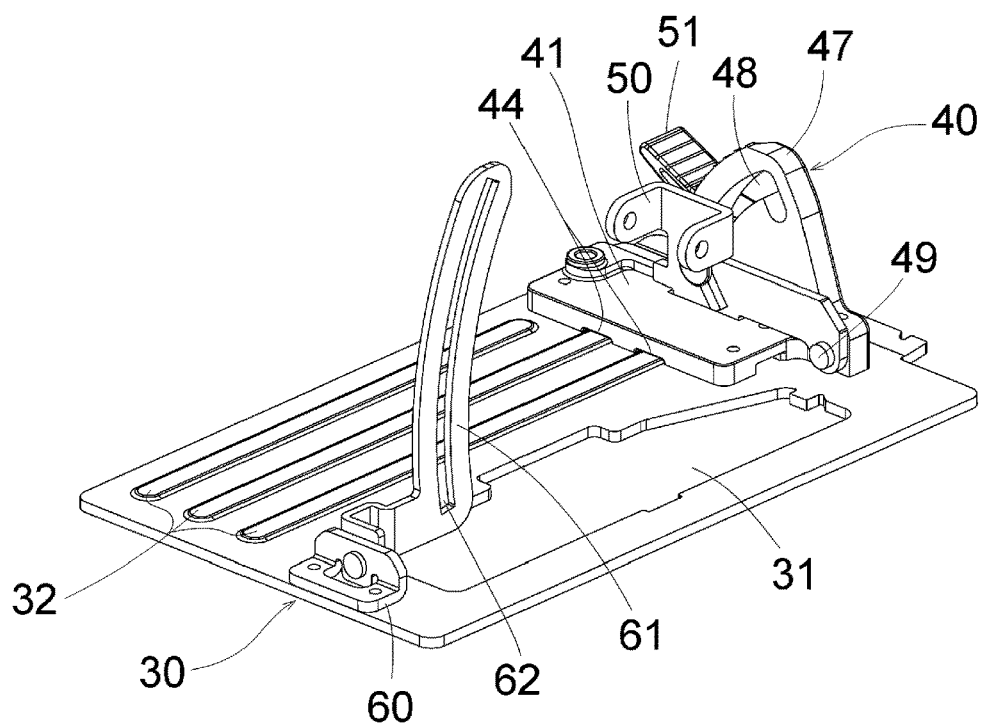
FIG. 12 is a perspective view of the base set of FIG. 11 as viewed from the rear upper left side.
Figure 13:
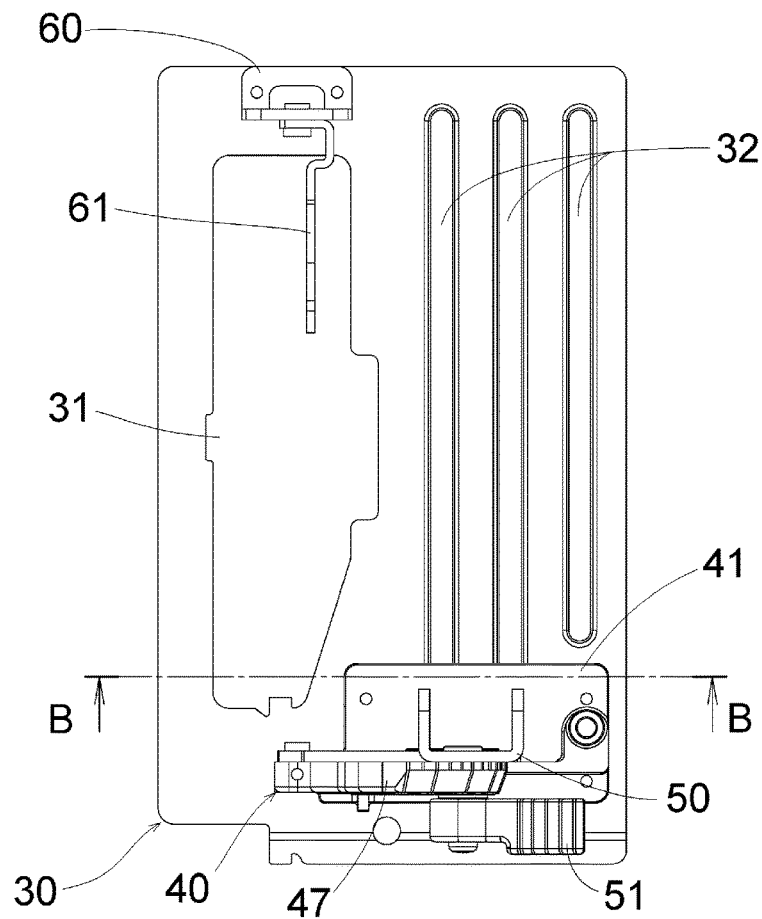
FIG. 13 is a plan view of the base set of FIG. 11.
Figure 14:
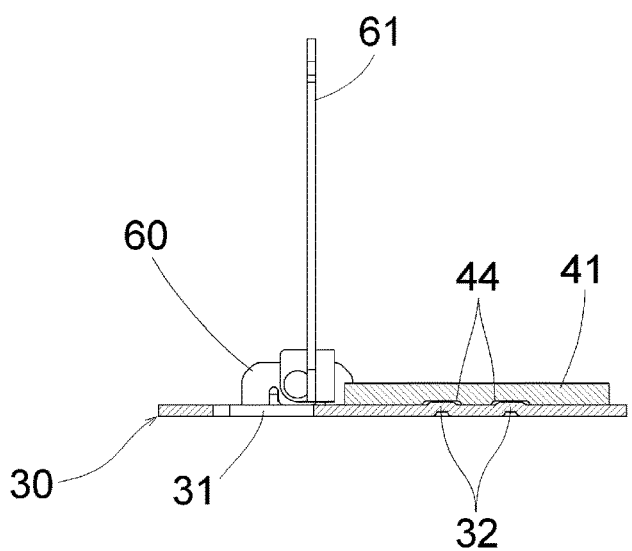
FIG. 14 is a cross-sectional view along the line B-B in FIG. 13.
Figure 15:
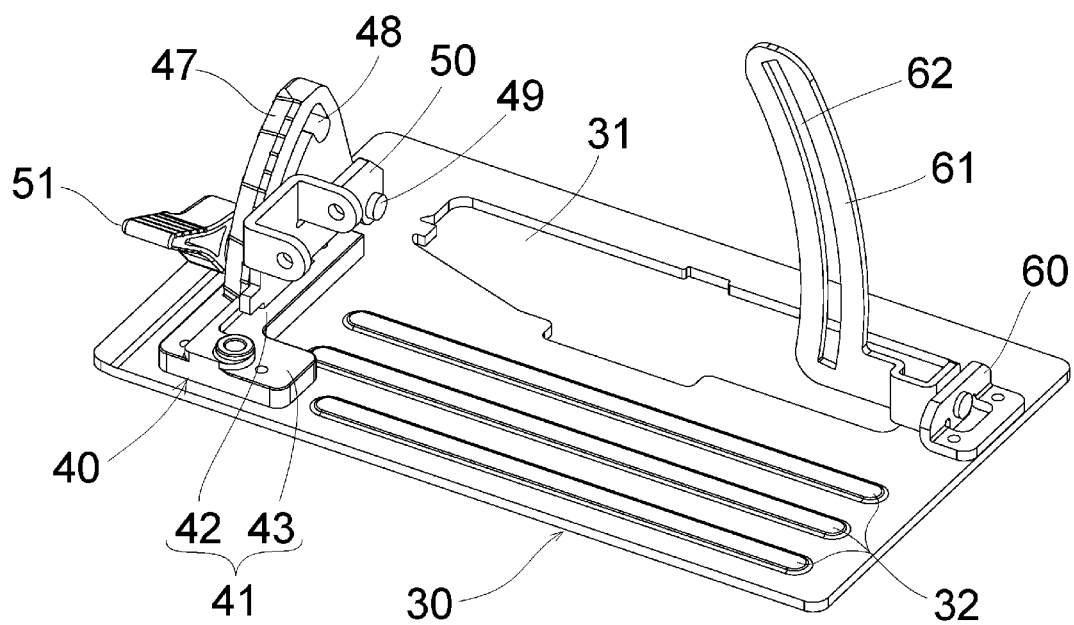
FIG. 15 is a perspective view of the base set of the portable cutter according to the third embodiment of the disclosure as viewed from the rear upper right side.
Figure 16:
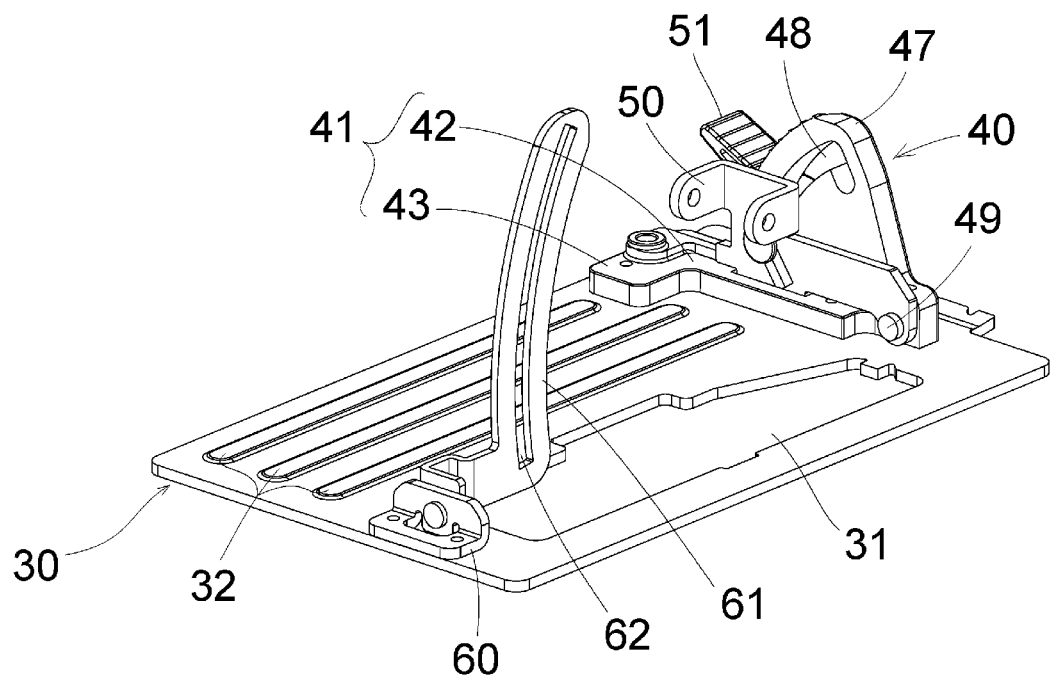
FIG. 16 is a perspective view of the base set of FIG. 15 as viewed from the rear upper left side.
Figure 17:
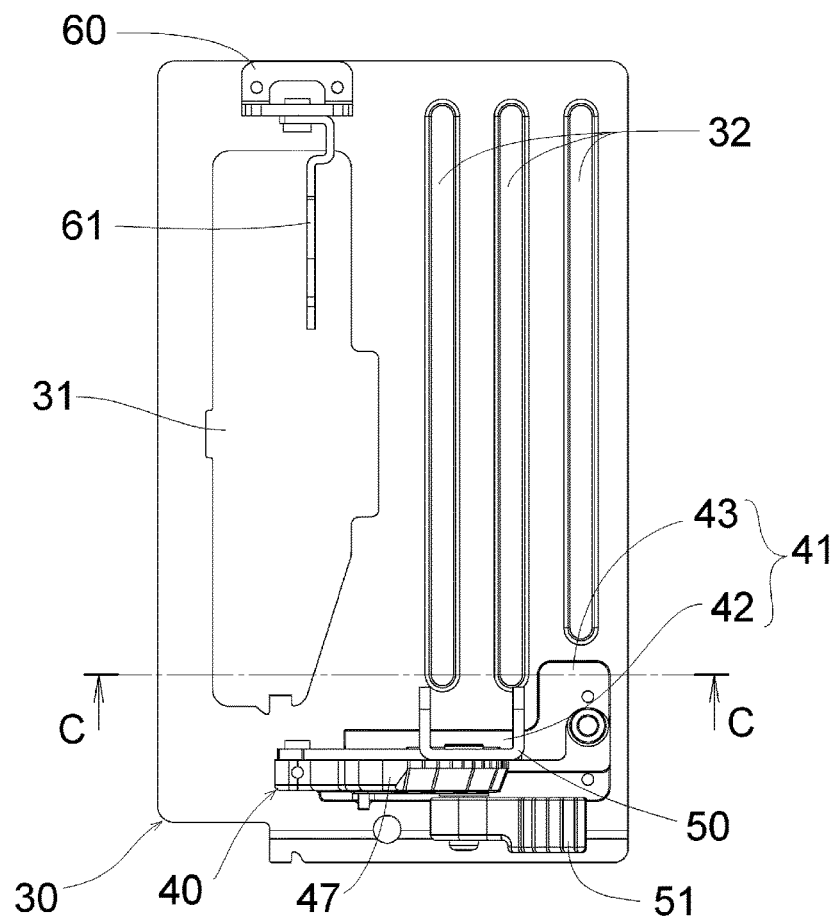
FIG. 17 is a plan view of the base set of FIG. 15.
Figure 18:
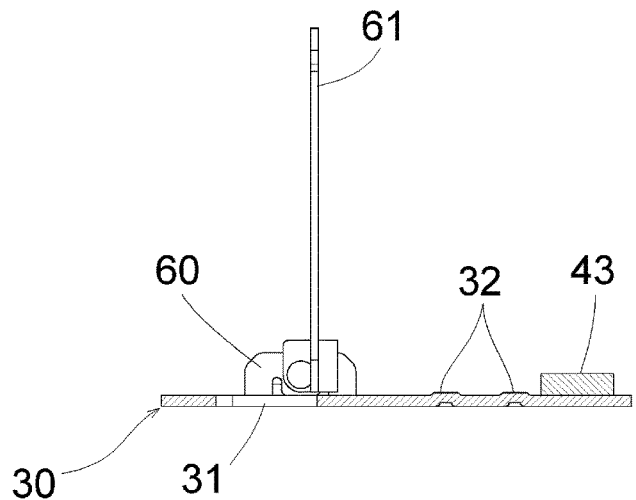
FIG. 18 is a cross-sectional view along the line C-C in FIG. 17.

The base 30 is, for example, a substantially rectangular sheet metal part made of metal such as aluminum. The longitudinal direction of the base 30 coincides with the cutting progress direction. The bottom surface of the base 30 is a sliding surface for a material to be cut. The base 30 has the through-hole 31 that allows the saw blade 16 to pass through and a plurality of reinforcing ribs 32. The rib 32 is an embossed rib formed by emboss processing and is formed so that the upper surface is convex, and it is recessed on the opposite surface (lower surface) as shown in FIG. 10. The ribs 32 extend substantially in parallel to the cutting progress direction (front-rear direction) and are disposed side by side in the left-right direction.

The stand 40 is disposed upright at the front end portion of the base 30 and forms a tilting position adjustment mechanism for adjusting the tilting position of the body 10. The stand 40 is a metal part (die casting, for example) separate from the base 30 and is fixed to the front end portion of the base 30 by screwing or the like. The stand 40 has a base part 41 and a bevel plate part 47. The base part 41 is a part fixed to the base 30 and includes a first part 42 extending in the left-right direction and second parts 43 extending rearward from the first part 42. The first part 42 extends rightward from the formation region of the through-hole 31 in the left-right direction. Two second parts 43 are provided in the present embodiment and extend rearward from the left and right end portions of the first part 42 respectively. The positions, in the front-rear direction, of the second parts 43 (parts that are in contact with the upper surface of the base 30 and contribute to the reinforcement of the base 30) and the left two ribs 32 of the three ribs 32 of the base 30 partially overlap each other. Specifically, the base part 41 is U-shaped as viewed from above, and the left two ribs 32 extend to the inner side of the U shape of the base part 41 (the front end portions of the ribs 32 are positioned on the inner side of the U shape of the base part 41. The left two ribs 32 and the second parts 43 partially overlap with each other in the region where the through-hole 31 is formed in the left-right direction.

The bevel plate part 47 is substantially perpendicular to the front-rear direction, rises from the base part 41, has a tilting guide hole 48, and functions as a tilting guide for the body 10. The tilting guide hole 48 is an arc-shaped long hole centered on a tilting shaft 49 that is substantially parallel to the front-rear direction. The connection member 50 is a member for connecting the body 10 and the stand 40, and one end of the connection member 50 is rotatably supported by the tilting shaft 49. The other end of the connection member 50 rotatably supports the housing 11 of the body 10. By loosening a tilting fixed lever 51, the user can make the connection member 50 rotatable around the tilting shaft 49 to adjust the tilting position of the body 10. In addition, by tightening the tilting fixed lever 51, the user can fix the rotational position of the connection member 50 to fix the tilting position of the body 10.

The bracket 60 is a support of the link 61 which constitutes a cutting depth adjustment mechanism, and is fixed to the base 30 by screwing or the like at the rear of the through-hole 31. The link 61 enables the body 10 to swing in the upper-lower direction. The link 61 has an arc-shaped long hole 62 and functions as a swing guide for the body 10. By loosening a swing fixed lever 63, the user can adjust the swing position (that is, the depth of cutting of the saw blade 16) of the body 10. In addition, by tightening the swing fixed lever 63, the user can fix the swing position of the body 10.

According to the present embodiment, the following effects can be achieved.

Figure 23:
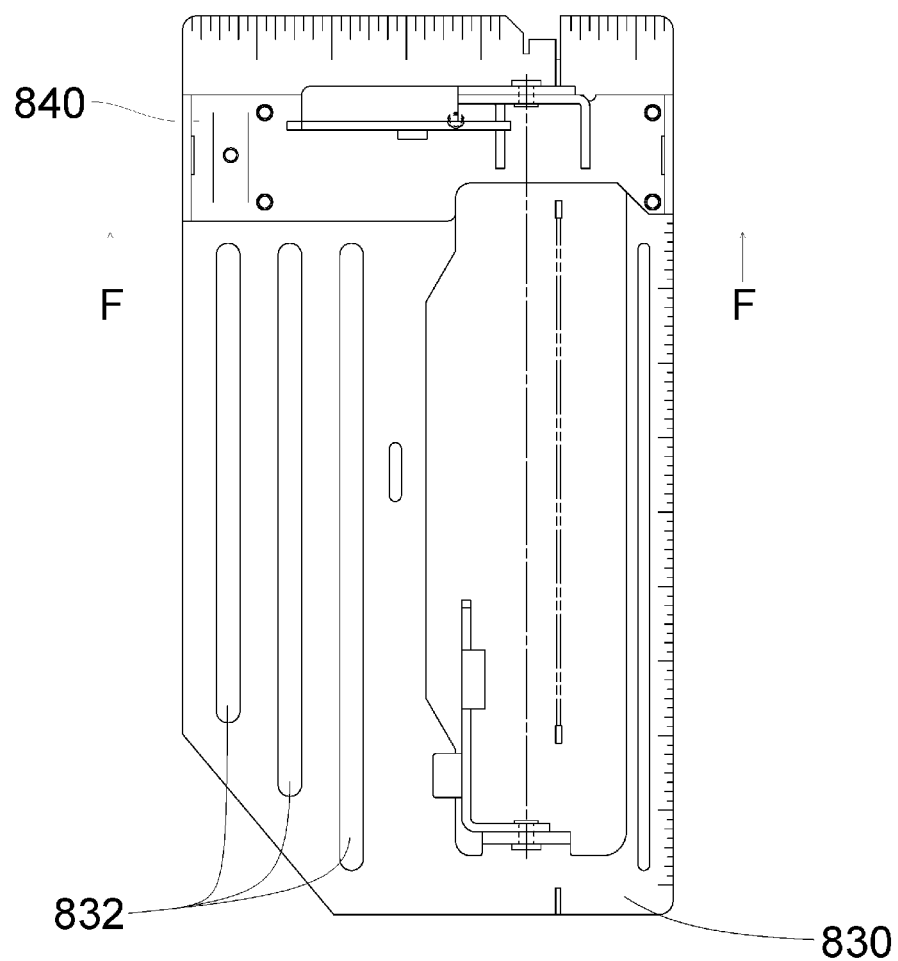
FIG. 23 is a plan view of the base set of the portable cutter according to a comparative example.

(1) The positions, in the front-rear direction, of the left two ribs 32 of the base 30 and the contact part between the base part 41 of the stand 40 and the upper surface of the base 30 partially overlap each other. Therefore, at least one of the ribs 32 and the base part 41 exists in the perpendicular cross section of the base 30 (the cross section on the plane perpendicular to the front-rear direction) from the rear end of the ribs 32 to the front end of the base part 41, and the strength of the base 30 can be increased as compared with the comparative example shown in FIG. 23 (where neither the ribs 832 nor the stand 840 exists in the F-F cross section).

(2) Since the base 30 is a sheet metal part, brittleness can be reduced as compared with the case of die casting.

(Second Embodiment) A portable cutter according to the second embodiment of the disclosure will be described with reference to FIG. 11 to FIG. 14. The portable cutter of the present embodiment is the same as that of the first embodiment except for the structure of the base part 41 of the stand 40. The following focuses on the difference. The base part 41 is substantially rectangular as viewed from above, and covers the top of the front end portion of the left two ribs 32 of the base 30. The base part 41 has two tunnel parts 44 opened on the rear end side, and the front end portions of the left two ribs 32 of the base 30 enter the tunnel parts 44 respectively. The present embodiment can also achieve the same effect as the first embodiment.

(Third Embodiment) A portable cutter according to the third embodiment of the disclosure will be described with reference to FIG. 15 to FIG. 18. The portable cutter of the present embodiment is the same as that of the first embodiment except that the second part 43 on the left side of the base part 41 of the stand 40 is omitted (the base part 41 changes from the U shape to an L shape as viewed from above). The present embodiment can also achieve the same effect as the first embodiment.

Figure 19:
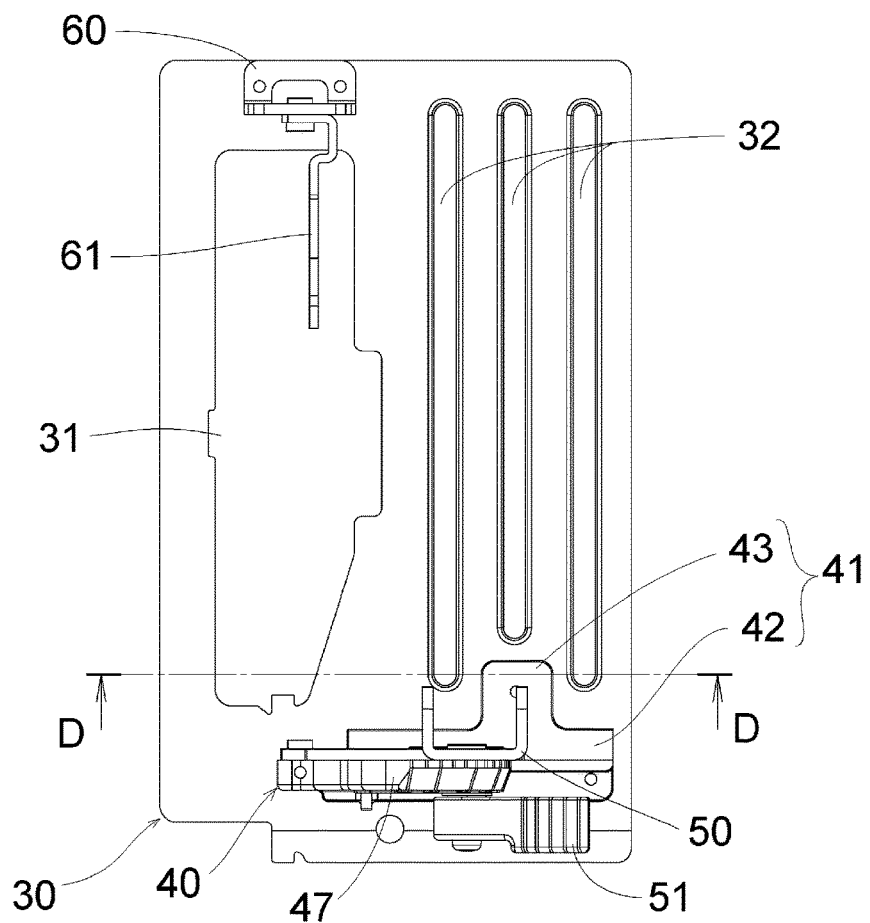
FIG. 19 is a plan view of the base set of the portable cutter according to the fourth embodiment of the disclosure.
Figure 20:
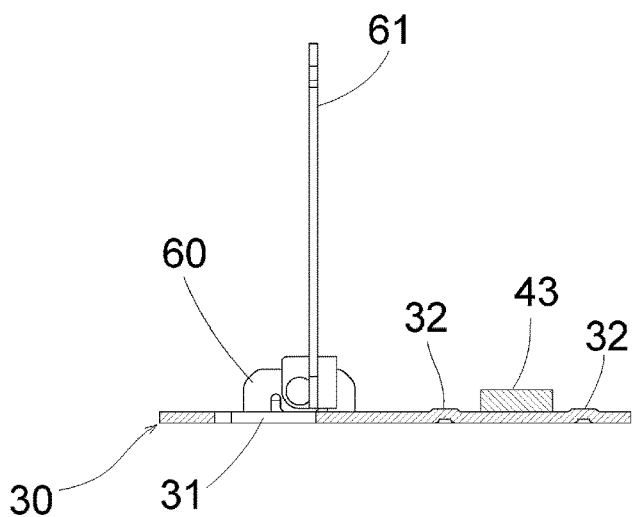
FIG. 20 is a cross-sectional view along the line D-D in FIG. 19.

(Fourth Embodiment) A portable cutter according to the fourth embodiment of the disclosure will be described with reference to FIG. 19 and FIG. 20. The portable cutter of the present embodiment is the same as that of the first embodiment except that the second part 43 of the base part 41 of the stand 40 extends rearward from the middle portion of the first part 42 in the left-right direction (the base part 41 changes from the U shape to a T shape as viewed from above), and the positions, in the front-rear direction, of the left and right ribs 32 of the three ribs 32 of the base 30 and the second part 43 partially overlap each other. The present embodiment can also achieve the same effect as the first embodiment.

Figure 21:
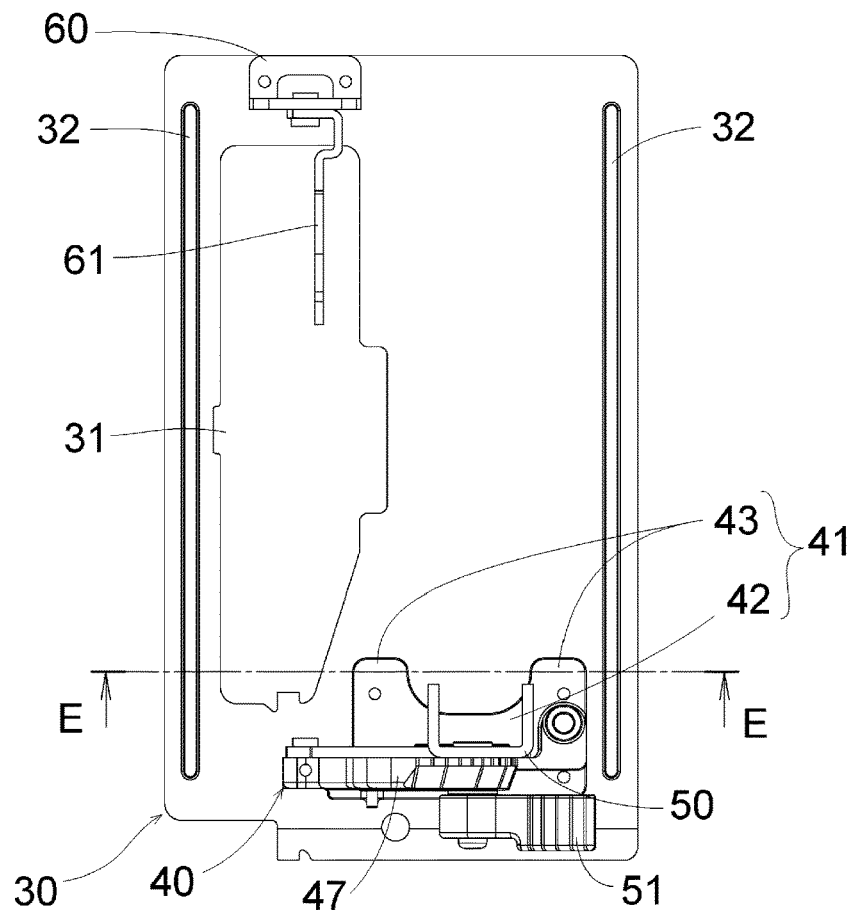
FIG. 21 is a plan view of the base set of the portable cutter according to the fifth embodiment of the disclosure.
Figure 22:
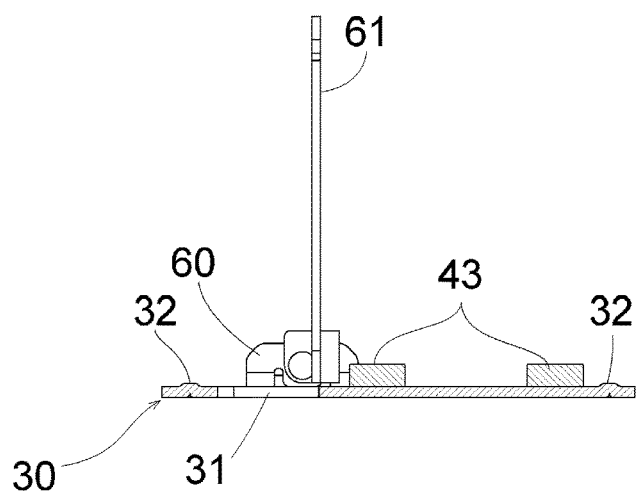
FIG. 22 is a cross-sectional view along the line E-E in FIG. 21.

(Fifth Embodiment) A portable cutter according to the fifth embodiment of the disclosure will be described with reference to FIG. 21 and FIG. 22. The portable cutter of the present embodiment is the same as that of the first embodiment except that the ribs 32 are provided on the left side of the through-hole 31 and on the right side of the base part 41, and the positions, in the front-rear direction, of each rib 32 and the base part 41 partially overlap each other. The present embodiment can also achieve the same effect as the first embodiment.

Although the disclosure has been described above with the embodiments as examples, those skilled in the art should understand that it is possible to make various modifications to each component and each processing process of the embodiments within the scope of the claims. Modified examples are provided below.

The portable cutter 1 is not limited to a circular saw and may be other types of devices such as a jigsaw. The number of the ribs 32 is not limited to the examples of the embodiments and may be one or any number. The rib 32 is not limited to the shape that extends in parallel to the front-rear direction, and the shape of the rib 32 may extend diagonally in the front-rear direction. In addition, a plurality of ribs 32 extending in different directions may intersect each other.

What is claimed is:

1. A portable cutter, comprising:
   a body comprising a prime mover and a blade driven by the prime mover;
   a base having a through-hole, through which the blade protrudes, and sliding on a material to be cut; and
   a stand disposed upright on the base for connecting the body,
   wherein when a cutting progress direction is set as a front-rear direction,
   the base is provided with a rib extending in the front-rear direction,
   the stand is positioned or extends outside a formation region of the through-hole in a left-right direction,
   wherein the stand comprises a first part extending in the left-right direction, and a second part extending from the first part in the front-rear direction,
   positions, in the front-rear direction, of the second part and of the rib partially overlap each other,
   the stand is a part separate from the base, and
   the rib and a contact part between the stand and the base overlap each other in the left-right direction.

2. The portable cutter according to claim 1, wherein the base is a sheet metal part.

3. The portable cutter according to claim 2, wherein the stand is a tilting guide for adjusting an inclination angle of the body with the front-rear direction as an axis.

4. The portable cutter according to claim 3, wherein the stand comprises a tunnel part, and
   the rib extends into the tunnel part.

5. The portable cutter according to claim 2, wherein the stand comprises a tunnel part, and
   the rib extends into the tunnel part.

6. The portable cutter according to claim 1, wherein the stand is a tilting guide for adjusting an inclination angle of the body with the front-rear direction as an axis.

7. The portable cutter according to claim 6, wherein the stand comprises a tunnel part, and
   the rib extends into the tunnel part.

8. The portable cutter according to claim 1, wherein the stand comprises a tunnel part, and
   the rib extends into the tunnel part.

9. The portable cutter according to claim 1, wherein the second part is disposed adjacent to a side of the through-hole in the left-right direction.

* * * * *